United States Patent
Vogel et al.

(10) Patent No.: US 9,908,966 B2
(45) Date of Patent: *Mar. 6, 2018

(54) ADDUCT CURING AGENTS

(71) Applicant: Dow Global Technologies LLC, Midland, MI (US)

(72) Inventors: Erin B. Vogel, Midland, MI (US); Stephen W. King, League City, TX (US); Ray E. Drumright, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/422,231

(22) PCT Filed: Oct. 23, 2013

(86) PCT No.: PCT/US2013/066286
§ 371 (c)(1),
(2) Date: Feb. 18, 2015

(87) PCT Pub. No.: WO2014/066456
PCT Pub. Date: May 1, 2014

(65) Prior Publication Data
US 2015/0240026 A1 Aug. 27, 2015

Related U.S. Application Data

(60) Provisional application No. 61/717,655, filed on Oct. 24, 2012.

(51) Int. Cl.
*C08L 63/00* (2006.01)
*C09D 163/00* (2006.01)
(Continued)

(52) U.S. Cl.
CPC ....... *C08G 59/1477* (2013.01); *C08G 59/184* (2013.01); *C08G 59/5026* (2013.01);
(Continued)

(58) Field of Classification Search
CPC .............. C08G 59/5026; C08G 59/184; C08G 59/1477; C08G 59/5073;
(Continued)

(56) References Cited

U.S. PATENT DOCUMENTS

| 4,310,695 A | 1/1982 | Dante |
| 4,316,003 A | 2/1982 | Dante et al. |

(Continued)

FOREIGN PATENT DOCUMENTS

| EP | 0044816 A1 * | 1/1982 | ........... C08G 59/184 |
| WO | WO 1997/033931 A1 | 9/1997 | |

(Continued)

*Primary Examiner* — Kregg T Brooks
(74) *Attorney, Agent, or Firm* — Karl E. Stauss; Cantor Colburn LLP (57) ABSTRACT

An adduct including a reaction product of (a) at least one cyclic polyamine compound; and (b) at least one epoxy resin compound; a curable composition including (i) the above adduct, and (ii) at least one thermosetting epoxy resin compound; and a thermoset prepared from the above curable composition.

10 Claims, 4 Drawing Sheets

(51) Int. Cl.
*C08G 59/14* (2006.01)
*C08G 59/18* (2006.01)
*C08G 59/40* (2006.01)
*C08G 59/50* (2006.01)

(52) U.S. Cl.
CPC .......... *C08G 59/5073* (2013.01); *C08L 63/00* (2013.01); *C09D 163/00* (2013.01); *C08L 2205/025* (2013.01)

(58) Field of Classification Search
CPC ..... C08L 63/00–63/10; C09D 163/00–163/10; C09J 163/00–163/10
See application file for complete search history.

(56) References Cited

U.S. PATENT DOCUMENTS

| | | | |
|---|---|---|---|
| 4,990,672 A | | 2/1991 | Johnson et al. |
| 5,256,786 A | * | 10/1993 | Bowman .............. C07D 295/13 544/357 |
| 5,310,770 A | | 5/1994 | DeGooyer et al. |
| 9,567,480 B2 | * | 2/2017 | Vogel ..................... C08G 59/24 |
| 2011/0040046 A1 | * | 2/2011 | Hefner, Jr. ........... C08G 59/182 525/533 |

FOREIGN PATENT DOCUMENTS

| | | |
|---|---|---|
| WO | WO 2009/142898 A1 | 11/2009 |
| WO | WO 2013102006 A1 * | 7/2013 ......... C08G 59/5073 |

* cited by examiner

ADDUCT CURING AGENTS

FIELD

The present invention is related to an adduct of (a) at least one epoxy resin compound, and (b) at least one cyclic polyamine compound. The adduct of the present invention is useful as a curing agent in a curable thermosetting composition containing for example a thermosetting epoxy resin compound. The curable composition is useful for preparing a thermoset such as for example a coating.

BACKGROUND

It is well known in the art that amines can be used as curing agents for epoxy resins. However, in general many amines are not compatible with epoxy resins; and a curable coating composition prepared from such a combination of an incompatible mixture of an amine and an epoxy resin can deleteriously affect the final coating properties of a coating product made from such curable coating composition containing the incompatible compounds. For example, ethyleneamines when used as curing agents are not compatible with liquid epoxy resins (LER); and subsequently, coating films formed from a thermoset formulation of a LER and an ethyleneamine are typically of low gloss and the coating film may have a greasy feel or chalky feel to the touch. The incompatibility of the ethyleneamine with the LER can also cause "blushing" on the surface of the resultant coating due to reactivity of the ethyleneamine with atmospheric water and carbon dioxide.

As is known in the art, blushing is the appearance of a "wax-like" film that sits on the surface of a cured thermoset resin such as an epoxy resin. Blushing, sometimes also referred to as water spotting, occurs on a film or coating product when moisture condenses on a coating surface during the curing process. Blushing manifests itself as white patches or a milky, hazy effect in clear coatings and may cause lack of gloss in pigmented coatings. This type of blush caused by an amine curing agent can prevent the composition from fully curing. Blushing can also prevent a cured product from performing correctly. In addition, blushing can produce yellowing in a cured thermoset. Usually, formation of blush on a film is determined by visual inspection of the film and the visibility of the blush can depend on the moisture in the air during the curing process. However, blushing can still occur on the surface of a film even if it is not always visible.

Heretofore, one common solution to the blushing and compatibility problem is to first synthesize an amine-epoxy adduct such as an adduct of an ethyleneamine and a LER, and then use the resultant adduct as a curing agent in an epoxy curable coating composition. Use of an adduct in an epoxy curable coating composition minimizes the potential for blush and bloom formation in a final coating product. Blooming can occur on a coating product when the amount of condensate causes water-soluble compounds to migrate from the body of the coating to the coating surface. When the moisture evaporates the leached components will appear on the surface as sticky deposits.

Volatile organic compounds (VOCs) are organic chemical compounds that have a high vapor pressure at ambient temperatures. The high vapor pressure results from a low boiling point, which causes large numbers of molecules to evaporate from the liquid of the compound and enter the surrounding atmosphere. A VOC is any organic compound having an initial boiling point less than or equal to 250° C. measured at a standard atmospheric pressure of 101.3 kPa. It would be desirable to provide an amine adduct that has a low VOC and a higher boiling point (e.g. greater than 300° C.) than previously known adducts.

Ethyleneamines are even less compatible with aliphatic epoxy resins. Thus, first forming an adduct of an ethyleneamine with an aliphatic epoxy resin and subsequently reacting this adduct with an epoxy resin is not a solution to the problem of compatibility. For example, (i) an aliphatic epoxy resin such as cyclohexane dimethanol (CHDM) epoxy resin or hydrogenated bisphenol A (h-BisA) epoxy resin, and (ii) an ethyleneamine such as diethylenetriamine (DETA) or triethylenetetraamine (TETA), are incompatible and such a formulation will not form a uniform coating as indicated by gloss of the coating for example wherein the coating has a gloss of greater than about 80 at about 60°.

Still, the skilled artisan has tried to use an amine adduct made from ethyleneamines in an effort to overcome the shortcomings of slow cure speed, blushing, bloom, VOC, and incompatibility. For example, U.S. Pat. No. 4,316,003 discloses synthesizing amine adducts by (1) initially reacting an epoxy resin with a mono amine followed by (2) reacting the resulting condensate of step (1) with a polyamine such that the resulting adducts can be used as curing agents in waterborne applications.

U.S. Pat. No. 4,310,695 discloses synthesizing adducts by reacting an amine, such as an ethyleneamine, with an epoxy; and then reacting the resulting amine-epoxy condensate with a strong base to eliminate chlorine present in the amine-epoxy condensate to form a final adduct product. The adduct as a curing agent is then subsequently reacted with an epoxide resin to form a cured product.

Other amine-epoxy adducts are disclosed in for example WO01997033931A1; U.S. Pat. No. 5,310,770; and WO2009142898(A1).

What is needed in the coating industry is an amine adduct that has a higher reactivity than previously known adducts, that has improved compatibility with liquid epoxy resins (including aliphatic and/or aromatic epoxy resins), and that provides a coating with minimal blush and/or bloom.

SUMMARY

One embodiment of the present invention is directed to an adduct including a reaction product of (a) at least one cyclic polyamine compound; and (b) at least one epoxy resin compound. For example in one embodiment, the cyclic polyamine useful in making the above adduct can be an ethyleneamine compound such as bis(2-(piperazin-1-yl)ethyl)amine (BPEA).

In the present invention, a cyclic polyamine compound such as BPEA can be treated with epoxy resins (e.g. aromatic and/or aliphatic) to generate adducts as a new family of hardeners. Advantageously, cyclic polyamine compounds such as BPEA have a combination of a higher boiling point and higher reactivity with epoxy resins compared to other commercially available amines. For example, the boiling point of BPEA is 365° C. Furthermore, when a cyclic polyamine compound such as BPEA is adducted with an epoxy resin and said adduct is used in a curable composition, the resulting adduct retains its high reactivity to afford a highly reactive compatible curable composition and a low VOC containing-composition.

In addition, the cyclic polyamine adducts of the present invention have good compatibility with liquid epoxy resins (e.g. aliphatic and/or aromatic) for example as determined by visually inspecting a coating's appearance and a coating's minimal blush and/or bloom.

A coating prepared from a curable composition containing cyclic polyamine-epoxy adducts such as BPEA-epoxy adducts can exhibit good weathering properties compared to coatings made from a curable composition containing adducts prepared with other ethyleneamines or cycloaliphatic amines; for example, as measured by gloss and color maintenance. It is desirable to prepare curable composition that provides a coating with reduced chalking and fading problems. Other good weatherable properties of the coating include water resistance, less blistering, and lower rust.

Furthermore, the high reactivity of the cyclic polyamine-epoxy adducts make such adducts suitable for coatings, composites, and civil engineering applications requiring ambient temperature cure.

Another embodiment of the present invention is directed to a curable epoxy resin composition comprising (i) the above adduct, and (ii) at least one thermosetting epoxy resin compound.

Still another embodiment of the present invention is directed to a thermoset prepared from the above curable composition.

Yet other embodiments of the present invention are directed to processes for manufacturing the above adduct, curable composition, and thermoset.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

One broad embodiment of the present invention is directed to providing an adduct including a reaction product of (a) at least one cyclic polyamine compound, and (b) at least one epoxy resin compound. In one preferred embodiment, the cyclic polyamine compound may comprise bis(2-(piperazin-1-yl)ethyl)amine (BPEA).

The amine compound useful in preparing the adduct of the present invention may include any cyclic polyamine compound having a high reactivity with an epoxy resin and comprising at least two cyclic polyamine rings. These cyclic polyamine compounds can be formed via the transamination of a cyclic polyamine component that comprises at least two amine groups separated from one another by at least a binary carbon atom spacing. As used herein, the term "carbon atom spacing" refers to the number of carbon atoms between the various functional groups. For example, the term binary spacing refers to a two carbon atom spacing; the term ternary spacing refers to a three carbon atom spacing; etc. The binary, ternary, or other carbon atom spacing is that portion of the particular molecule that separates the various functional groups therein. An example of a polyamine product(s) of the present invention is a compound resulting from the transamination of a cyclic polyamine component.

For example, a preferred polyamine compound comprises at least two cyclic rings that each have at least two amine groups separated from one another by a binary carbon spacing (C2 spacing) in each cyclic ring. The types of cyclic polyamine compounds useful in the present invention may include the polyamine compounds described in U.S. patent application Ser. No. 61/581,323, titled FORMATION OF HIGHER MOLECULAR WEIGHT CYCLIC POLYAMINE COMPOUNDS FROM CYCLIC POLYAMINE COMPOUNDS, filed Dec. 29, 2011 by Stephen King, incorporated herein by reference.

In preferred embodiments, for example, the generic Formula I and II, set forth below, represent examples of the highly reactive cyclic polyfunctional amine compounds useful in the present invention.

Formula I

Forumla II wherein each R, T, U, V, W, X, Y, and Z group, in Formula I and II above, is the same or different and is selected from hydrogen, or a hydrocarbyl group; and the value of x is 0 to 10, with the proviso that if x is greater than 1, each T may be the same or different.

Hydrocarbyl groups that may be used in the practice of the invention may be substituted or unsubstituted, linear, branched, or cyclic hydrocarbyl such as alkyl, aryl, aralkyl, or the like; a monovalent moiety including one or more heteroatoms; polyether chains comprising one or more oxyalkylene repeating units such as —$R^1$O—, wherein $R^1$ is often alkylene of 2 to 5 carbon atoms; other oligomeric or polymer chains of at least 2 repeating units. Preferably, R, T, U, V, W, X, Y and Z are H or straight, branched, or cyclic hydrocarbyl such as alkyl of 1 to 10 carbon atoms, preferably 1 to 3 carbon atoms. More preferably, R, T, U, V, W, X, Y and Z are H.

The values of x in the above chemical formulae and the practice of the present invention are typically in the range of from 0 to 10 in one embodiment, in the range of from 2 to 5 in another embodiment, in the range of from 2 to 3 in still another embodiment, and 0 or 1 in yet another embodiment.

Examples of the highly reactive cyclic polyamines consistent with Formula I that are useful in the present invention include bis(2-(piperazin-1-yl)ethyl)amine (BPEA), (3-(piperazin-1-yl)propyl)amine, bis(4-(piperazin-1-yl)butyl) amine, bis(5-(piperazin-1-yl)pentyl)amine, bis(6-(piperazin-1-yl)hexyl)amine, bis(1-(piperazin-1-yl)propan-2-yl)amine, bis(2-(piperazin-1-yl)propyl)amine, and mixtures thereof.

Examples of the high molecular weight, cyclic polyamines consistent with Formula II that are useful in the present invention include 2-(4-(2-(piperazin-1-yl)ethyl)piperazin-1-yl)ethanamine, 3-(4-(3-(piperazin-1-yl)propyl)piperazin-1-yl)propan-1-amine, 4-(4-(4-(piperazin-1-yl)butyl) piperazin-1-yl)butan-1-amine, 5-(4-(5-(piperazin-1-yl) pentyl)piperazin-1-yl)pentan-1-amine, 6-(4-(6-(piperazin-1-yl)hexyl)piperazin-1-yl)hexan-1-amine, 1-(4-(1-(piperazin-1-yl)propan-2-yl)piperazin-1-yl)propan-2-amine, 2-(4-(2-(piperazin-1-yl)propyl)piperazin-1-yl)propan-1-amine, and mixtures thereof.

One preferred embodiment of the cyclic polyamine compound useful in preparing the adduct of the present invention includes for example bis(2-(piperazin-1-yl)ethyl)amine (BPEA); 2-(4-(2-(piperazin-1-yl)ethyl)piperazin-1-yl) ethanamine, high molecular weight BPEA oligomers; and mixtures thereof.

The molecular weight of the cyclic polyamine compound useful the present invention may range generally from about 200 g/mol to about 10,000 g/mol in one embodiment, and from about 240 g/mol to about 2,000 g/mol in another embodiment.

The concentration of the cyclic polyamine compound used in preparing the adduct of the present invention may range generally from about 20 weight percent (wt %) to about 98 wt % in one embodiment, from about 30 wt % to about 97 wt % in another embodiment, from about 40 wt % to about 96 wt % in still another embodiment, and from about 50 wt % to about 95 wt % in yet another embodiment, based on the weight of the total components in the composition. Below the aforementioned ranges the product may be too viscous to use without a lot of solvent. Above the aforementioned ranges there is no further economic or practical benefit.

A typical range of reactive N—H groups of the amine compound to the epoxy groups of the epoxy compound to produce the adduct may vary. For example, the molar equivalents of reactive N—H in the amine compound to epoxy group in the epoxy compound used in preparing the adduct of the present invention may range generally up to about 20 molar equivalents in one embodiment, up to about 18 mole equivalents in another embodiment, up to about 15 mole equivalents in still another embodiment, and up to about 12 mole equivalents in yet another embodiment, based on the moles of epoxy components in the adduct recipe. Generally, the molar equivalents of active hydrogen (N—H) in the cycloaliphatic amine compound used in preparing the adduct of the present invention may range generally from about 2 to about 20 in one embodiment, from about 3 to about 18 in another embodiment, from about 5 to about 15 in still another embodiment, and from about 8 to about 12 in yet another embodiment, based on the moles of epoxy functionality used in preparing the adduct.

The adduct composition of the present invention includes at least one epoxy compound as component (b) to form the adduct. For example, the epoxy compound useful in the present invention may include any conventional epoxy compound.

One embodiment of the epoxy compound used in the adduct composition of the present invention, may be for example a single epoxy compound used alone; or a combination of two or more epoxy compounds known in the art such as any of the epoxy compounds described in Lee, H. and Neville, K., *Handbook of Epoxy Resins*, McGraw-Hill Book Company, New York, 1967, Chapter 2, pages 2-1 to 2-27, incorporated herein by reference. In a preferred embodiment, the epoxy compound may include for example epoxy resins based on reaction products of monofunctional or polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, cresol glycidyl ether, phenyl glycidyl ether, C12-C14 aliphatic glycidyl ether, butanediol diglycidyl ether, hexanediol diglycidyl ether, cyclohexanedimethanol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy compound may also be selected from commercially available epoxy resin products such as for example, D.E.R. 331®, D.E.R. 332, D.E.R. 354, D.E.R. 580, D.E.N. 425, D.E.N. 431, D.E.N. 438, D.E.R. 736, or D.E.R. 732 epoxy resins available from The Dow Chemical Company.

Preferred embodiments of the epoxy resin useful in the present invention include for example an epoxy resin referred to as cyclohexanedimethanol epoxy resin, an epoxy resin referred to as UNOXOL™ epoxy resin, a hydrogenated bisphenol epoxy resin, an aromatic epoxy resin, and mixtures thereof.

Other preferred embodiments of the epoxy resin compound useful in the present invention may include for example a bisphenol A epoxy resin; a bisphenol F epoxy resin; an epoxy novolac; and mixtures thereof.

Generally, the amount of epoxy compound used in the adduct composition of the present invention, may be for example, from about 2 wt % to about 80 wt % in one embodiment, from about 3 wt % to about 70 wt % in another embodiment; and from about 4 wt % to about 60 wt % in still another embodiment, and from about 5 wt % to about 50 wt % in yet another embodiment based on the total weight of the adduct composition. If the concentration of the epoxy compound falls outside of the aforementioned ranges, the resulting adduct will either be too viscous for practical application or the concentration of the adduct will be too small and compatibility will not be enhanced.

Other optional additives known to the skilled artisan can be included in the adduct composition such as for example plasticizers and solvents, and other additives for various enduse applications. Generally, the amount of optional compounds or additives used in preparing the adduct composition of the present invention, may be for example, from 0 wt % to about 60 wt %.

The process for preparing the adduct composition of the present invention includes admixing (a) at least one cyclic polyamine compound such as BPEA, and (b) at least one epoxy resin compound. Other optional ingredients can be added to the adduct composition as needed. In one embodiment, the preparation of the adduct composition of the present invention is achieved by blending, in known mixing equipment, the cyclic polyamine compound and the epoxy compound, and optionally any other desirable additives. Any of the above-mentioned compounds used to prepare the adduct composition can be admixed together in any mixing order.

All the compounds of the adduct composition are typically mixed and dispersed at a temperature enabling the preparation of an effective adduct composition for a particular application such as for a coating composition. For example, the temperature during the mixing of all components in the adduct composition may be generally from about 10° C. to about 150° C. in one embodiment, and from about 20° C. to about 100° C. in another embodiment. In one embodiment, advantageously the conditions above can be modified so that the adduct composition can be made in a short amount of time and will not discolor upon excessive heating.

The preparation of the adduct composition of the present invention, and/or any of the steps thereof, may be a batch or a continuous process. The mixing equipment used in the process may be any vessel and ancillary equipment well known to those skilled in the art.

Compatibility of the adduct composition with an epoxy resin is important when the adduct is used to prepare a curable composition because when the adduct is blended with an epoxy resin and the curable composition is subsequently cured to form a thermoset product, compatibility is required for obtaining good cure and the desired final properties of the coating product formed from the cured product. Compatibility may be assessed by gloss of the cured clear (non-pigmented) film; and the gloss of the film may be for example above 80 for 60° gloss in one embodiment.

The viscosity of the adduct composition of the present invention may range generally from about 0.1 Pa-s to about 200 Pa-s in one embodiment, from about 0.2 Pa-s to about 100 Pa-s in another embodiment, and from about 0.5 Pa-s to about 50 Pa-s in still another embodiment. The use of the adduct composition can be limited if the viscosity of the adduct composition is higher than the above ranges of viscosities.

In order to formulate a curable composition, one of the components of the curable composition includes a thermosetting resin such as an epoxy resin compound and one of the other components of the curable composition includes a curing agent (also referred to as a hardener or cross-linking agent). The curing agent is used to cure the thermoset resin into a cured matrix.

The component used as the curing agent in the curable composition of the present invention is the adduct composition described above. Accordingly, another broad embodiment of the present invention includes a curable epoxy resin formulation or composition including (i) the above adduct composition, and (ii) at least one thermosetting epoxy resin compound. Other optional additives known to the skilled artisan can be included in the curable composition such as for example a curing catalyst and other additives for various enduse applications.

The curing agent used in the curable composition of the present invention as component (i) comprises the adduct composition as described above.

The molar equivalence of the adduct composition used in the curable composition of the present invention may range generally from about 0.5 to about 1.5 mole equivalents in one embodiment, from about 0.6 to about 1.3 mole equivalents in another embodiment, from about 0.7 to about 1.1 mole equivalents in still another embodiment based on the moles of epoxy of the curable composition. If the concentration of the adduct is outside the above listed ranges, the adduct will either be present in significant excess or depletion, which creates coatings that will not be fully cured and will have poor final coating properties.

The thermosetting epoxy resin compound useful as component (ii) in preparing a curable composition of the present invention may comprise, for example, any one or more of the epoxy compounds described above with reference to preparing the adduct composition.

Some of the preferred thermosetting epoxy compounds useful in the present invention include CHDM epoxy resin, h-BisA epoxy resin, aromatic epoxy resins, or blends of the aforementioned resins.

The molar equivalence of thermosetting epoxy compound used in the curable composition of the present invention as the epoxy resin compound may range generally from about 0.7 to about 2 molar equivalents in one embodiment, from about 0.8 to about 1.5 molar equivalents in another embodiment, from about 0.9 to about 1.4 molar equivalents in still another embodiment based on the moles of active amine hydrogen (N—H) in the curable composition. If the concentration of the thermosetting epoxy compound is outside the above listed ranges, the thermosetting epoxy compound will either be present in significant excess or depletion, which creates coatings that will not be fully cured and will have poor final coating properties.

Other optional compounds may be added to the curable composition of the present invention and may include compounds that are normally used in curable resin compositions known to those skilled in the art for preparing curable compositions and thermosets to function in combination with the thermosetting epoxy compound and/or the adduct composition of the present invention. For example, the optional components may include compounds that can be added to the composition to enhance application properties (e.g. surface tension modifiers or flow aids), reliability properties (e.g. adhesion promoters), the reaction rate, viscosity, the selectivity of the reaction, and/or the catalyst lifetime.

For example, in addition to the adduct composition used as the curing agent for the thermosetting epoxy compound in the curable composition of the present invention, optionally any one or more additional conventional curing agents may be included in the curable composition to function in combination with the adduct composition of the present invention to cure the thermosetting epoxy compound.

The optional curing agent useful in the curable composition, may be selected, for example, but are not limited to, anhydrides, carboxylic acids, amine compounds, phenolic compounds, thiol compounds, or mixtures thereof.

Generally, the optional conventional curing agent known in the art can be blended with the adduct, component (i), or the optional conventional curing agent can be blended with the thermosetting epoxy resin compound, component (ii), to prepare the curable composition.

Examples of the optional curing agents useful in the present invention may include any of the co-reactive or catalytic curing materials known to be useful for curing epoxy resin-based compositions. Such co-reactive curing agents include, for example, polyamine, polyamide, polyaminoamide, mannich base, dicyandiamide, polymeric thiol, polycarboxylic acid and anhydride, and any combination thereof or the like. Suitable catalytic curing agents include tertiary amine, quaternary ammonium halide, Lewis acids such as boron trifluoride, salicylic acid, alkylated phenols, and any combination thereof or the like. Other specific examples of co-reactive curing agents include diaminodiphenylsulfone, styrene-maleic acid anhydride (SMA) copolymers; and any combination thereof. Among the conventional co-reactive epoxy curing agents, amines and amino or amido containing resins and phenolics are preferred.

Preferred embodiments of other curing agents blended with the inventive curing agents useful in the present invention may include for example polyamides; polyamines; polymercaptans; mannich bases; and mixtures thereof.

When an optional curing agent is used in the curable composition, generally, the combined amount of the optional curing agent used in combination with the adduct curing agent in the curable composition of the present invention can be a molar equivalence of the adduct and optional curing agent combined generally in the range of from about 0.5 mole equivalents to about 1.5 mole equivalents in one embodiment, from about 0.6 mole equivalents to about 1.3 mole equivalents in another embodiment, from about 0.7 mole equivalents to about 1.1 mole equivalents in still another embodiment based on the moles of epoxy of the curable composition. If the concentration of the combined adduct/optional curing agent is outside the above listed ranges, the compounds will either be present in significant excess or depletion, which creates coatings that will not be fully cured and will have poor final coating properties.

In preparing the curable resin composition of the present invention, other optional compounds may be used as additional additives in the curable composition including for example at least one cure catalyst to facilitate the reaction of the epoxy resin compound with the adduct curing agent (and optional curing agents, if used). The catalyst useful in the present invention may include for example, tertiary amine, salicylic acid, alkyl phenol, benzyl alcohol or any combination thereof. The optional catalyst compounds that may be added to the curable composition of the present invention may include for example benzyl alcohol, alkyl phenols, salicylic acid, and tris-2,4,6-dimethylaminomethyl phenol.

In addition to the above optional compounds that may be added to the curable composition of the present invention, other optional compounds useful in the curable composition may include, for example, a solvent to lower the viscosity of the composition further or accelerate the curing reaction; other resins such as a phenolic resin that can be blended with the epoxy resin of the composition; other epoxy resins different from the at least one thermosetting epoxy resin compound, component (ii), of the present invention (for example, aromatic and aliphatic glycidyl ethers; cycloaliphatic epoxy resins; and divinylarene dioxides such as divinylbenzene dioxide); fillers including for example finely divided minerals such as silica, alumina, zirconia, talc, sulfates, $TiO_2$, carbon black, graphite, silicates, and the like; colorants including pigments, dyes, tints, and the like; toughening agents; accelerators; flow modifiers; adhesion promoters; diluents; stabilizers such as UV stabilizers; plasticizers; catalyst de-activators; flame retardants; reinforcing agents; rheology modifiers; surfactants; antioxidants; wetting agents; and mixtures thereof.

Generally, the amount of optional compounds or additives used in the curable composition of the present invention, may be for example, from 0 wt % to about 80 wt % in one embodiment, from about 0.01 wt % to about 70 wt % in another embodiment; from about 0.1 wt % to about 60 wt % in still another embodiment; from about 1 wt % to about 50 wt % in yet another embodiment, and from about 5 wt % to about 50 wt % in even still another embodiment, based on the total weight of the curable composition. The amount of optional compounds used will depend on the specific compounds used in the composition. As one illustration, when an accelerator is used, the amount can be from about 0.1 wt % to about 10 wt % for the accelerator such as tris-2,4,6-dimethylaminomethyl phenol. In another illustration, when an accelerator such as benzyl alcohol is used in the curable composition, the amount of the accelerator can be from about 5 wt % to about 70 wt %. In general, the above amounts can be determined by the skilled artisan.

The process for preparing the curable composition of the present invention includes admixing (i) the above adduct, (ii) at least one thermosetting epoxy resin compound, and (iii) optionally, other optional ingredients such as at least one cure catalyst or additional curing agent as needed. For example, the preparation of the curable resin composition of the present invention is achieved by blending, in known mixing equipment, the adduct, the epoxy compound, and optionally any other desirable additives. Any of the above-mentioned optional additives, for example a curing catalyst, may be added to the composition during the mixing or prior to the mixing to form the composition.

All the compounds of the curable composition are typically mixed and dispersed at a temperature enabling the preparation of an effective curable epoxy resin composition having the desired balance of properties for a particular application. For example, the temperature during the mixing of all components may be generally from about −5° C. to about 50° C. in one embodiment, and from about 10° C. to about 30° C. in another embodiment. Lower mixing temperatures help to minimize reaction of the epoxide and adduct curing agent in the composition to maximize the pot life of the composition.

The preparation of the curable composition of the present invention, and/or any of the steps thereof, may be a batch or a continuous process. The mixing equipment used in the process may be any vessel and ancillary equipment well known to those skilled in the art.

The process of the present invention includes curing the curable resin composition to form a thermoset or cured composition. In one embodiment, the curable resin composition can be cured at ambient cure. In another embodiment, the curable resin composition can be cured by forced cure at higher temperatures. Both methods provide a final cured product with desired properties.

Accordingly, the process of curing the curable composition may be carried out at a predetermined temperature and for a predetermined period of time sufficient to cure the composition. For example, the temperature of curing the composition may be generally from about −5° C. to about 300° C. in one embodiment; from about −5° C. to about 50° C. in another embodiment; from about 0° C. to about 30° C. in still another embodiment; from about 15° C. to about 25° C. in yet another embodiment; and from about 10° C. to about 20° C. in even still another embodiment.

Generally, the curing time may be chosen between about 1 minute to about 4 weeks in one embodiment, between about 6 hours to about 2 weeks in another embodiment, and between about 1 day to about 7 days in still another embodiment. Below a period of time of about 1 hour, the time may be too short to ensure sufficient time for applying the composition onto a substrate under conventional processing conditions; and above about 4 weeks, the time may be too long to be practical or economical.

Prior to completely curing the curable composition, the set to touch, tack free and dry through times of the curable composition can be measured particularly in applications such as coatings wherein the curable composition can be used in a sufficiently dry state before the composition completely cures; and can be handled in such dry form. The dry through time, particularly in field of coating, can generally be from about 2 hours to about 48 hours at ambient temperature (about 25° C.) in one embodiment; from about 4 hours to about 36 hours at ambient temperature in another embodiment; from 6 hours to about 24 hours at ambient temperature in still another embodiment; and from about 12 hours to about 24 hours at ambient temperature in yet another embodiment. Dry-through time is based on measurements obtained such as by dragging a needle through the coating using a BYK drying time recorder according to ASTM D5895-03.

The cured product of the present invention generally exhibits a glass transition temperature of greater than 20° C. in one embodiment, and from about 20° C. to about 200° C. in another embodiment. The Tg of the cured product can be measured by a differential scanning calorimetry (DSC) or a dynamic mechanical analysis (DMA) method.

The cured product of the present invention generally exhibits good weatherability. In one embodiment, weatherability can be measured in terms of the percentage gloss retention upon accelerated weathering according to ASTM D4587-11 after 1000 hours. For example, the gloss retention can be from about 30% to 100% in one embodiment, from about 50% to 100% in another embodiment, and from about 70% to 100% in yet another embodiment.

The curable composition of the present invention may be used to manufacture cured thermoset products such as for example various coatings. In particular, for example, the curable composition may be used in coating applications such as for example in preparing weatherable epoxy coatings.

EXAMPLES

The following examples and comparative examples further illustrate the present invention in detail but are not to be construed to limit the scope thereof.

Various terms and designations used in the following examples are explained herein below:

"BPEA" stands for bis(2-(piperazin-1-yl)ethyl)amine.
"CHDM" stands for 1,4-cyclohexanedimethanol.
"CHDM DGE" stands for 1,4-cyclohexanedimethanol diglycidyl ether.
"CHDM epoxy resin" stands for an epoxy resin prepared from 1,4-cyclohexanedimethanol and epichlorohydrin
"H-LER" stands for hydrogenated bisphenol A epoxy resin.
"AEP" stands for aminoethylpiperazine.
"IPDA" stands for isophorone diamine.
"1,3-BAC" stands for 1,3-bis-aminomethylcyclohexane.
"AHEW" stands for amine hydrogen equivalent weight.
"EEW" stands for epoxide equivalent weight.
D.E.R. 331 is an aromatic epoxy resin epoxy resin having an EEW of 190 and commercially available from The Dow Chemical Company.

Examples 1-8, 12 and Comparative Examples A-I

Adduct Synthesis

As shown in Table 1, a number of adducts were prepared using the general procedure below which describes, for example, preparing the adduct of BPEA and CHDM epoxy resin of Example 2.

100 g of BPEA (amine hydrogen is 8 molar times of epoxide) and 22.1 g of CHDM epoxy resin (EEW 142) were charged into a three-neck round bottomed flask equipped with a mechanical stirrer, internal temperature probe and reflux condenser. A nitrogen blanket and cooling water for the condenser were turned on and the mixer was set at about 250 revolutions per minute (RPM) to 300 RPM to mix the two ingredients well.

The flask was lowered into a pre-heated 50° C. oil bath while monitoring the internal temperature of the flask for an exothermic reaction. The temperature of the oil bath was increased by 10° every 20 minutes until the oil bath reached 100° C. The reaction was held at this temperature for 20 minutes. Then, the reaction was cooled and the product collected.

TABLE 1

Adducts Prepared and Theoretical AHEWs

| EXAMPLE | ADDUCT HARDENER (mole NH:mole epoxy) | THEORETICAL AHEW |
|---|---|---|
| Example 1 | BPEA + CHDM Epoxy Resin (15:1) | 96 |
| Example 2 | BPEA + CHDM Epoxy Resin (8:1) | 112 |
| Example 3 | BPEA + CHDM Epoxy Resin (4:1) | 155 |
| Example 4 | BPEA + DER 331 (15:1) | 100 |
| Example 5 | BPEA + DER 331 (8:1) | 119 |
| Comparative Example A | AEP + CHDM Epoxy Resin (8:1) | 69 |
| Comparative Example B | AEP + DER 331 (15:1) | 59 |
| Comparative Example C | IPDA + CHDM Epoxy Resin (10:1) | 59 |
| Comparative Example D | IPDA + CHDM Epoxy Resin (8:1) | 69 |
| Comparative Example E | IPDA + DER 331 (12:1) | 64 |
| Comparative Example F | 1,3-BAC + CHDM Epoxy Resin (8:1) | 61 |
| Comparative Example G | IPDA + H-LER (10:1) | 70 |
| Example 6 | BPEA + H-LER (10:1) | 112 |
| Comparative Example H | BAC + H-LER (10:1) | 62 |
| Example 7 | BAC/BPEA + CHDM Epoxy Resin (1/1)(10:1) | 77 |
| Comparative Example I | IPDA + CHDM Epoxy Resin (10:1) | 63 |
| Example 8 | BPEA/IPDA + CHDM Epoxy Resin + (1/1) (10:1) | 78 |
| Example 12 | IPDA + CHDM epoxy resin (12:1) | 60 |

Examples 9-10 and Comparative Examples J-N

Coating Dry Time Measurements

Coating formulations for Examples 9-10 and Comparative Example J-N, as described in Table 2, were prepared by mixing the indicated curing agent adduct prepared in the above Examples described in Table 1 with the indicated epoxy resin described in Table 1 at a 1:1 epoxy:NH stoichiometric ratio. The coatings were then drawn down onto glass substrates with a wet film thickness of 76 μm and drying evaluated on a BYK drying time recorder. The set-to-touch, tack-free, and dry-through times were measured by dragging a needle through the coating using a BYK drying time recorder according to ASTM D5895-03.

Figure 1:
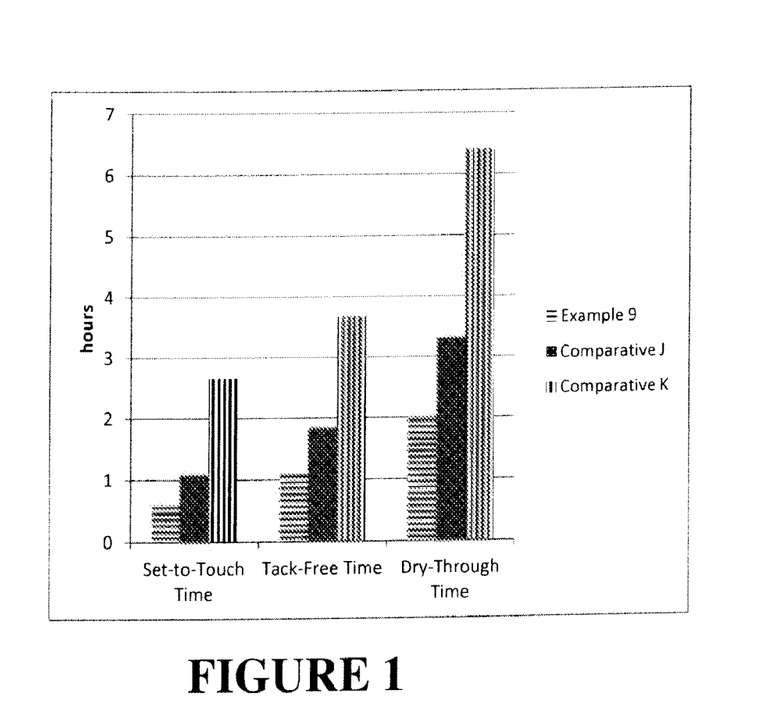
FIG. 1 is a graphical illustration showing dry times of coatings derived from BPEA-epoxy resin adducts wherein the epoxy resin is DER 331 (Examples of the present invention) compared to dry times of coatings derived from isophorone diamine (IPDA) and aminoethylpiperazine (AEP)-epoxy adducts wherein the epoxy resin is DER 331 (Comparative Examples).

FIG. 1 shows the dry times of coatings from BPEA adduct with an aromatic epoxy resin, DER 331 (EEW 190), and Comparative Examples with adducts from IPDA and AEP. The coating from adduct prepared from BPEA shows faster dry time than coatings from adducts prepared from IPDA and AEP.

Figure 2:
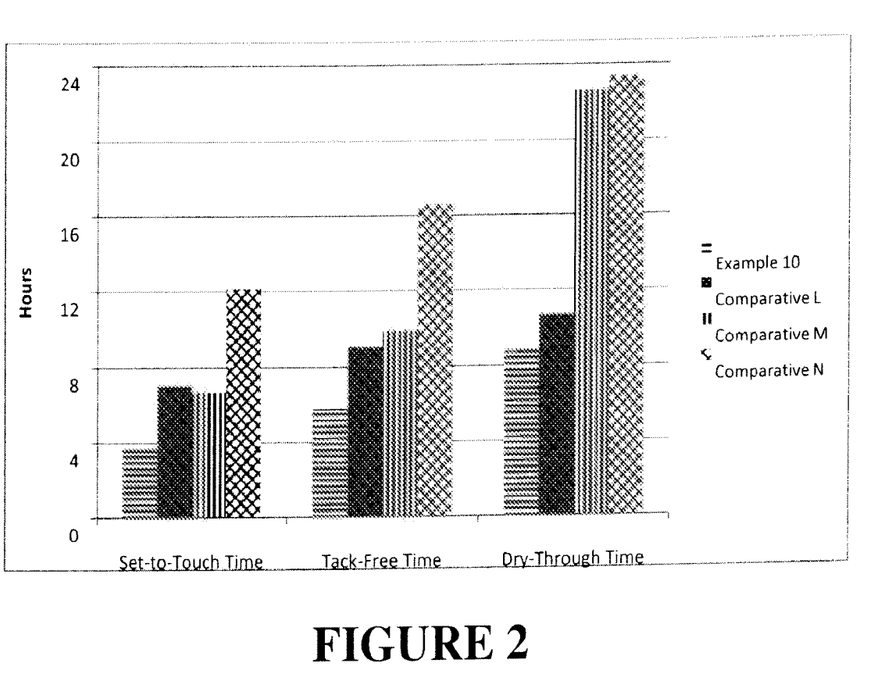
FIG. 2 is a graphical illustration showing dry times of coatings derived from BPEA-epoxy adducts wherein the epoxy resin is CHDM epoxy resin (Examples of the present invention) compared to dry times of coatings derived from IPDA, AEP, and 1,3-bis(aminomethyl)cyclohexane (1,3 BAC)-epoxy adducts wherein the epoxy resin is CHDM epoxy resin (Comparative Examples).

FIG. 2 shows dry times of aliphatic epoxy coatings prepared from BPEA adducts and comparative adducts cured at ambient temperature (20° C.). The samples were mixed with formulated CHDM epoxy resin (EEW of formulation is 279) at an epoxy to NH ratio of 1:1. It was unexpectedly found that the BPEA adduct provided an accelerated cure of the coating compared to the adducts from AEP, IPDA, or 1,3-BAC.

TABLE 2

Coating Formulations

| Example | Curing Agent | Epoxy |
|---|---|---|
| Example 9 | Example 4 | DER 331[a] |
| Comparative Example J | Comparative Example B | DER 331 |
| Comparative Example K | Comparative Example E | DER 331 |
| Example 10 | Example 2 | Pigmented CHDM Epoxy[b] |
| Comparative Example L | Comparative Example F | Pigmented CHDM Epoxy |
| Comparative Example M | Comparative Example D | Pigmented CHDM Epoxy |
| Comparative Example N | Comparative Example A | Pigmented CHDM Epoxy |
| Example 11 | Example 8 | Pigmented CHDM Epoxy |
| Comparative Example O | Comparative Example C | Pigmented CHDM Epoxy |
| Example 13 | Example 2 + Example 12 | Pigmented CHDM Epoxy[c] |
| Comparative Example P | Comparative Example A + Example 12 | Pigmented CHDM Epoxy[c] |

[a]DER 331 is a liquid epoxy resin with EEW of 190 available from The Dow Chemical Company.
[b]Pigmented CHDM Epoxy is a formulation consisting of 50.94 wt % CHDM epoxy resin (EEW 142), 0.76 wt % Bentone SD2, 14 wt % Ti-Pure R706, 26.7 wt % Imsil 1240, and 7.6 wt % Cimbar UF with an overall formulation EEW of 279.
[c]Pigmented CHDM Epoxy is a formulation consisting of 55.32 wt % CHDM epoxy resin (EEW 149), 1.56 wt % Bentone SD2, 82.94 wt % Ti-Pure R960, 0.10 wt % BYK066N with an overall formulation EEW of 249.

Example 11 and Comparative Examples O

Coating Gloss Retention

Coating formulations for Example 11 and Comparative Example O as described in Table 2 were prepared by mixing the indicated curing agent adduct prepared in the above Examples described in Table 1 with the indicated epoxy resin described in Table 1 at a 1:1 epoxy:NH stoichiometric ratio. The coating formulations were then applied to metal panels according to ASTM D4147-99 (2007). Each of the coating formulations was poured across the top end of the panel and a 50 μm wire wound drawdown bar was placed behind the mixture. The bar was then drawn with uniform pressure and speed along the length of the panel toward the operator to generate a uniform film. After coating the panels and forming a film thereon, the panels were cured at ambient temperature (about 25° C.) and humidity (about 60%) for 7 days. The panels were then subjected to accelerated weathering by cycling UV A light and condensing humidity on a 4 hour cycle according to ASTM D4587-11, for industrial maintenance coatings.

Figure 3:
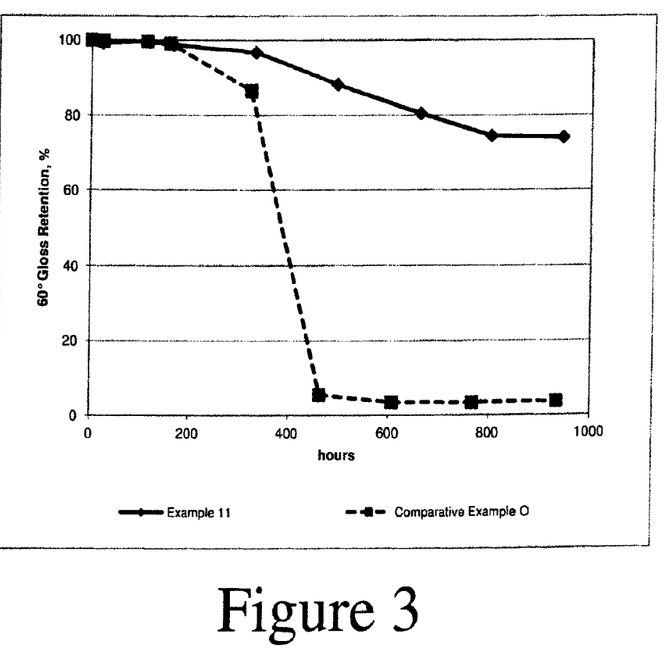
FIG. 3 is a graphical illustration showing superior gloss retention of a coating derived from a BPEA-containing adduct relative to that of a coating derived from an IPDA adduct.

As shown in FIG. 3, the superior gloss retention of a coating prepared from a formulation containing a BPEA adduct provides a greater gloss retention relative to that of a coating prepared from a formulation containing an IPDA adduct.

Example 13 and Comparative Examples P

Coating Gloss Retention

Figure 4:
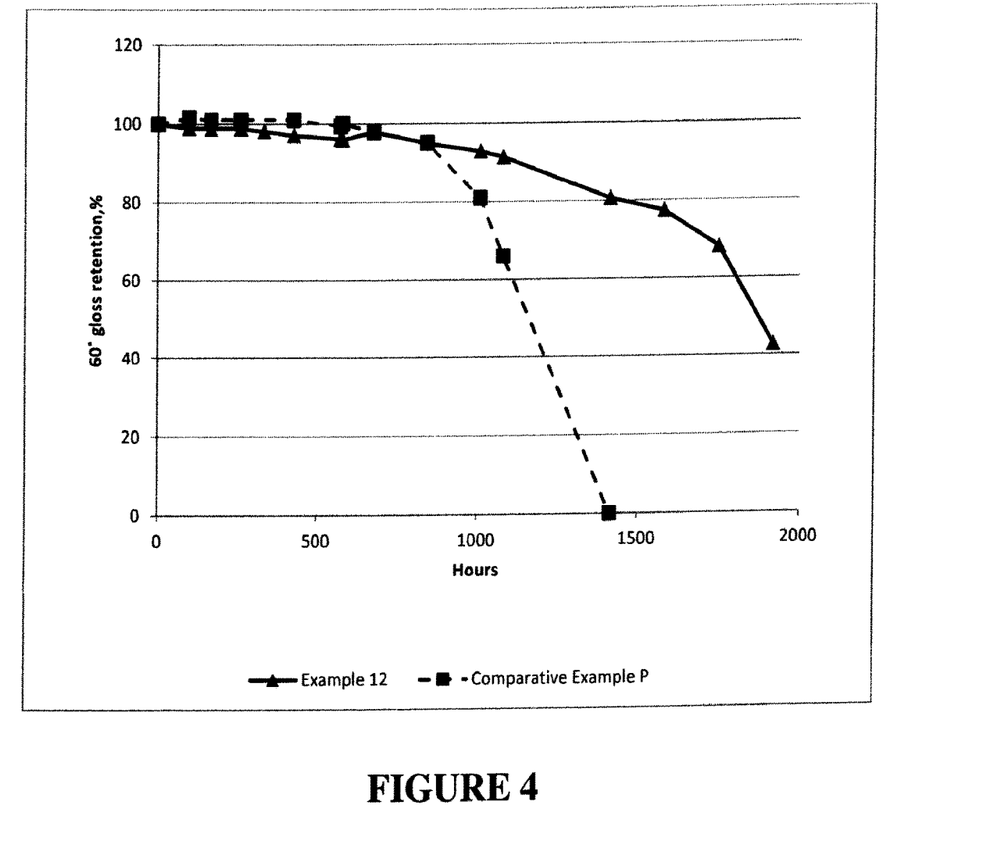
FIG. 4 is a graphical illustration showing superior gloss retention of a coating derived from a BPEA adduct/IPDA adduct blend, relative to that of a coating derived from an AEP adduct/IPDA adduct.

Coating formulations for Example 13 and Comparative Example P as described in Table 2 were prepared by mixing the indicated curing agent adduct blends (60 wt % Example 12+either Example 2 or Comparative Example A) prepared by the above Examples described in Table 1 with the indicated epoxy resin described in Table 1 at a 1:1 epoxy:NH stoichiometric ratio. The coating formulations were then applied to metal panels according to ASTM D4147-99 (2007). Each of the coating formulations was poured across the top end of the panel and a #50 wire size (0.050" wire diameter) wire wound drawdown bar was placed behind the mixture. The bar was then drawn with uniform pressure and speed along the length of the panel toward the operator to generate a uniform film. After coating the panels and forming a film thereon, the panels were cured at ambient temperature (about 25° C.) and humidity (about 9%) for 7 days. The panels were then subjected to accelerated weathering by cycling UV A light and condensing humidity on a 4 hour cycle according to ASTM D4587-11, for industrial maintenance coatings. As shown in FIG. 4, the superior gloss retention of a coating prepared from a formulation containing a BPEA adduct/IPDA adduct blend (Example 12) provides a greater gloss retention relative to that of a coating prepared from a formulation containing an AEP adduct/IPDA adduct (Comparative Example P).

The invention claimed is:
1. An adduct comprising a reaction product of:
(a) a cyclic polyamine compound consisting of bis(2-(piperazin-1-yl)ethyl)amine; 2-(4-(2-(piperazin-1-yl)ethyl)piperazin-1-yl)ethanamine; bis(2-(piperazin-1-yl)ethyl)amine oligomers; or mixtures thereof; and
(b) at least one epoxy resin compound;
wherein the reaction product excludes 1,4-cyclohexanedimethanol epoxy resin and hydrogenated bisphenol A epoxy resin; and
wherein the molar ratio of active N—H groups in the cyclic polyamine compound to epoxy groups in the epoxy resin compound is from about 3 to about 15.
2. The adduct of claim 1, wherein the epoxy resin compound comprises bisphenol A epoxy resin; bisphenol F epoxy resin, or mixtures thereof.
3. The adduct of claim 1, wherein the at least one cyclic polyamine compound comprises bis(2-(piperazin-1-yl)ethyl)amine; and wherein the epoxy resin compound comprises bisphenol A epoxy resin.
4. A curable epoxy resin composition comprising (i) an adduct of claim 1; and (ii) at least one thermosetting epoxy resin compound.
5. The curable epoxy resin composition of claim 4, wherein the molar ratio of N—H groups in the at least one adduct to epoxy groups in the at least one thermosetting epoxy resin compound is from about 0.5 to about 1.5.
6. The curable epoxy resin composition of claim 4, including at least one of a catalyst, an accelerator, a second curing agent separate and different from the at least one adduct curing agent, a second epoxide compound separate and different from the at least one thermosetting epoxy resin compound, a filler, a reactive diluent, a flexibilizing agent, a processing aide, a toughening agent, or a mixture thereof.
7. A process for preparing a curable composition comprising admixing (a) an adduct of claim 1, and (b) at least one thermosetting epoxy resin compound.

8. A process for preparing a thermoset comprising:
(I) providing a mixture of:
  (a) an adduct of claim 1, and
  (b) at least one thermosetting epoxy resin compound; and
(II) curing the curable composition of step (I).

9. A cured thermoset article prepared by the process of claim 8, wherein the article comprises a coating.

10. A process for preparing an adduct comprising reacting (a) a cyclic polyamine compound consisting of bis(2-(piperazin-1-yl)ethyl)amine; 2-(4-(2-(piperazin-1-yl)ethyl)piperazin-1-yl)ethanamine; bis(2-(piperazin-1-yl)ethyl)amine oligomers, or mixtures thereof; and
  (b) at least one epoxy resin compound;
  wherein the reaction product excludes 1,4-cyclohexanedimethanol epoxy resin and hydrogenated bisphenol A epoxy resin; and
  wherein the molar ratio of active N—H groups in the cyclic polyamine compound to epoxy groups in the epoxy resin compound is from about 3 to about 15.

* * * * *